United States Patent
Burstein et al.

(10) Patent No.: US 9,473,496 B2
(45) Date of Patent: *Oct. 18, 2016

(54) DYNAMICALLY MAPPING NETWORK TRUST RELATIONSHIPS

(71) Applicant: Cisco Technology, Inc., San Jose, CA (US)

(72) Inventors: Ori Burstein, Binyamina (IL); Yehoshua Hershberg, Beit Shemesh (IL); Dror Koren, Zichron Ya'akov (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/788,515

(22) Filed: Jun. 30, 2015

(65) Prior Publication Data

US 2015/0304327 A1 Oct. 22, 2015

Related U.S. Application Data

(63) Continuation of application No. 13/301,684, filed on Nov. 21, 2011, now Pat. No. 9,104,836.

(51) Int. Cl.
*G06F 21/00* (2013.01)
*H04L 29/06* (2006.01)
*G06F 21/34* (2013.01)

(52) U.S. Cl.
CPC ........... *H04L 63/0892* (2013.01); *G06F 21/00* (2013.01); *G06F 21/34* (2013.01); *H04L 63/08* (2013.01); *H04L 63/20* (2013.01)

(58) Field of Classification Search
USPC ............................................................ 726/1
See application file for complete search history.

(56) References Cited

U.S. PATENT DOCUMENTS

| 7,272,714 | B2 | 9/2007 | Nagaratnam et al. |
| 8,023,517 | B2 | 9/2011 | Yang et al. |
| 8,024,488 | B2 | 9/2011 | Salowey et al. |
| 8,027,679 | B2 * | 9/2011 | Prasad ................ H04L 63/0869 370/328 |
| 8,104,069 | B2 | 1/2012 | Thurm et al. |
| 8,291,212 | B2 | 10/2012 | Godfrey et al. |
| 8,549,650 | B2 | 10/2013 | Hanson |
| 8,560,646 | B1 | 10/2013 | Sivasubramanian et al. |
| 8,717,931 | B2 * | 5/2014 | Taniuchi ............. H04L 12/5692 370/254 |
| 8,929,330 | B2 * | 1/2015 | Taniuchi ....................... 370/331 |

(Continued)

OTHER PUBLICATIONS

U.S. Appl. No. 13/301,684, filed Nov. 21, 2011, Office Action, Sep. 16, 2014.
U.S. Appl. No. 13/301,684, filed Nov. 21, 2011, Notice of Allowance, Apr. 14, 2015.
U.S. Appl. No. 13/301,684, filed Nov. 21, 2011, Final Office Action, Feb. 20, 2015.
U.S. Appl. No. 13/301,684, filed Nov. 21, 2011, Final Office Action, Apr. 17, 2014.
U.S. Appl. No. 13/301,684, filed Nov. 21, 2011, Office Action, Nov. 14, 2013.
Networking Named Content, http://conference.sigcomm.org/conext/2009/papers/Jacobson.pdf/Jacobson et al./dated 2009 12 pages.

*Primary Examiner* — Mahfuzur Rahman
(74) *Attorney, Agent, or Firm* — Hickman Palermo Becker Bingham LLP; Malgorzata A. Kulczycka

(57) ABSTRACT

In an embodiment, the method is comprising, receiving an access request, from an authenticator device, to grant a supplicant device access to a data network; transmitting the access request to an authentication server; after sending a response that the access request was granted, updating a trust topology map by including in the trust topology map information that has been obtained from the response and that indicates a secure link between the authenticator device and the supplicant device, and causing displaying the updated trust topology map as a logical map depicting one or more network devices and roles assigned to the one or more network devices; wherein the method is performed by one or more computing device.

20 Claims, 5 Drawing Sheets

(56) References Cited

U.S. PATENT DOCUMENTS

| | | |
|---|---|---|
| 2002/0053032 A1 | 5/2002 | Dowling et al. |
| 2004/0103282 A1 | 5/2004 | Meier et al. |
| 2005/0086300 A1 | 4/2005 | Yeager et al. |
| 2006/0056411 A1 | 3/2006 | Badat et al. |
| 2006/0156280 A1 | 7/2006 | Chen et al. |
| 2007/0121596 A1* | 5/2007 | Kurapati .......... H04L 29/06027 370/356 |
| 2011/0137991 A1 | 6/2011 | Russell |
| 2011/0277034 A1 | 11/2011 | Hanson |
| 2013/0044764 A1 | 2/2013 | Casado et al. |

* cited by examiner

DYNAMICALLY MAPPING NETWORK TRUST RELATIONSHIPS

BENEFIT CLAIM

This application claims the benefit under 35 U.S.C. §120 as a Continuation of application Ser. No. 13/301,684, filed Nov. 21, 2011, the entire contents of which are hereby incorporated by reference for all purposes as if fully set forth herein. The applicants hereby rescind any disclaimer of claim scope in the parent application or the prosecution history thereof and advise the USPTO that the claims in this application may be broader than any claim in the parent application.

TECHNICAL FIELD

The present disclosure is generally related to data communications between devices in a distributed network infrastructure, and specifically relates to representing trust relationships and security relationships established among devices.

BACKGROUND

"TrustSec" is a set of computer programs and message communications protocols providing access control and other security features developed by Cisco Systems, Inc., San Jose, Calif., with the goal of providing self-defending networks. TrustSec introduced the concept of peer authentication and authorization between network devices. TrustSec is designed to determine, based on policies and roles assigned to users and devices in the network, whether access to a secure and trusted network can be granted or restricted.

A Cisco TrustSec (CTS) network comprises network devices and end-hosts. In a CTS network, each network device authenticates its neighbor to an authentication, authorization and accounting (AAA) server. During the authentication process, the device sends an authentication request to the AAA server and retrieves from the AAA server authorization policies pertaining to the neighbor. The authentication and authorization may occur within the same protocol exchange or within a separate protocol exchange.

A neighbor can be either another network device or an end-host. A secure link between network devices or a network device and an end-host has associated security properties, such as encryption and authorization schemes. By performing peer authentication and authorization, and by establishing trust relationships with other entities in a trusted network, a neighbor becomes a part of a trusted domain or "cloud." Messages exchanged during the AAA process comprise various characteristics specific to the secure and trusted relationships that are established in the trusted cloud.

DESCRIPTION OF EXAMPLE EMBODIMENTS

Figure 1:
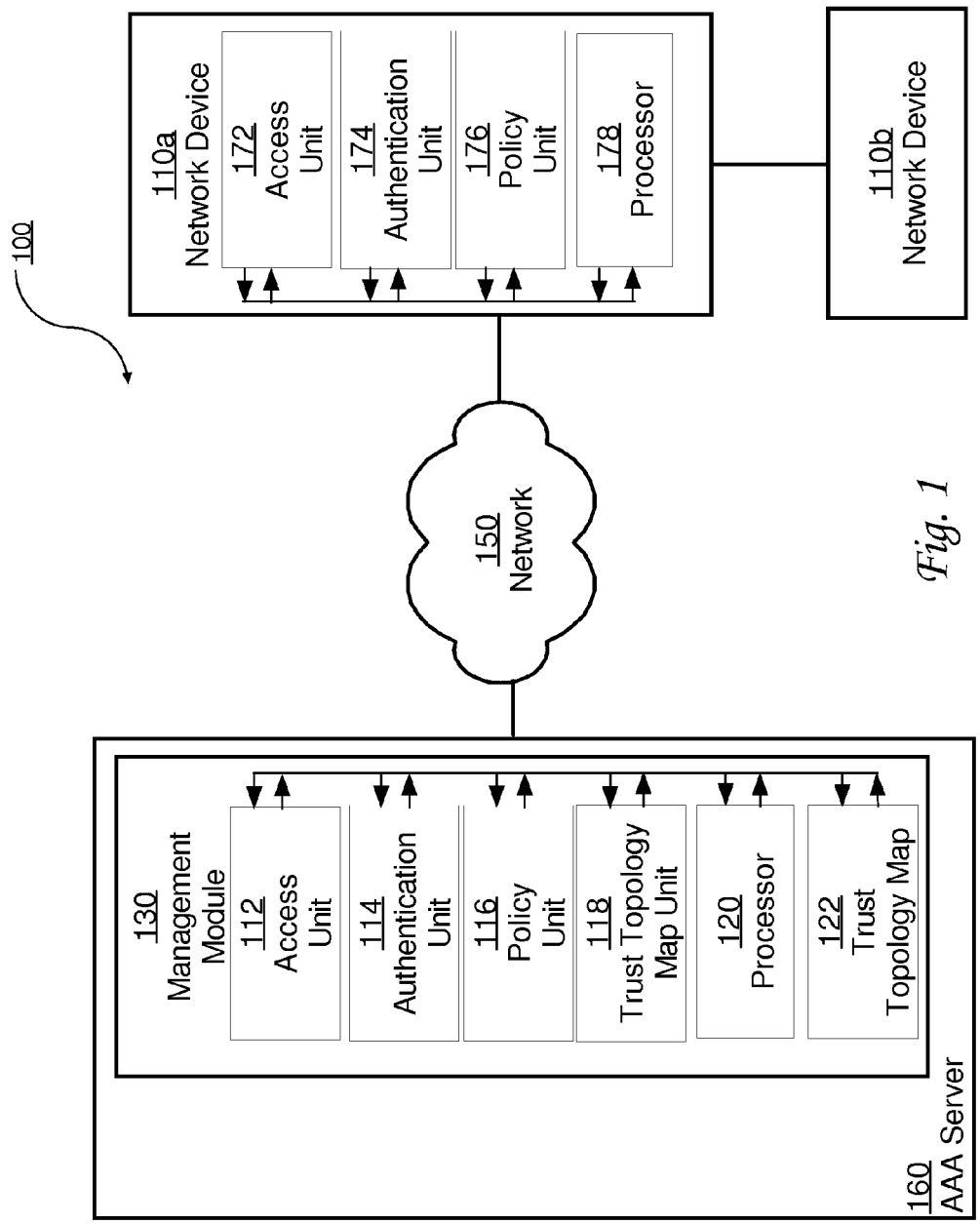
FIG. 1 illustrates an embodiment of network devices configured to determine trust topology maps from trust and secure relationships.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Determining Trust Topology Maps from Trust and Secure relationships
4.0 Processing Access Requests
5.0 Implementation Mechanisms—Hardware Overview
6.0 Extensions and Alternatives 1.0 Overview In an embodiment, an approach is presented for generating, updating and maintaining trust topology maps built based on one or more trust relationships or security relationships that have been established among network devices. The trust topology maps can be developed by processing data that are transmitted in authentication conversations or messages formatted according to an Authorization, Authentication and Accounting (AAA) protocol.

As devices join a secure network, the devices may become a part of a secure cloud. The cloud of trusted and secured network devices can have associated one or more particular characteristics.

In an embodiment, information collected by an AAA server and by management devices communicating with the AAA server can be used to build a diagram that represents a topology of a trusted and secured network topology.

One embodiment may be used in the context of Cisco TrustSec, but Cisco TrustSec is not required for all embodiments. The information acquired by an AAA server during authentication and authorization of a TrustSec device and information available to the AAA server from other sources can be used to build a trust topology map.

In an embodiment, information acquired by an AAA server during an authentication and authorization process can be used by a network management system to build a diagram of the network topology and to represent a virtual layer of a trust topology map. The map can include information about trusted links, encrypted links, policies applied to the links, and security properties specific to the links and devices. In an embodiment, in the trust topology map built from the trust relationships, the links and paths can be color-coded according to the encryption capabilities, security properties and other characteristics identified according to TrustSec.

In an embodiment, an approach for generating, updating and maintaining trust topology maps that are built from trust relationship information can be used to troubleshoot a secure network, to perform a security analysis, and to simulate various condition of operation for the secure network.

In an embodiment, a network topology map reflecting trust relationships or security relationships is formed based on data exchanged in authentication conversations related to security requirements in a trusted network. The authentication conversations related to security issues can be performed on a variety of platforms and using a variety of protocols; examples include RADIUS, TACACS+, and other protocols, such as EAP.

In an embodiment, a method is performed at management device such as an access router or other computing device, and comprises receiving an access request, from an authenticator device, to grant a supplicant device access to a trusted network; transmitting the access request to an authentication server; after sending a response that the access request was granted, updating a trust topology map by including in the trust topology map information that was obtained from the response and that is about a secure link established between the authenticator device and the supplicant device.

In an embodiment, the method further comprises receiving a peer policy request, from the authenticator device and/or from the supplicant device, to obtain a peer policy for the supplicant device; in response to receiving a response comprising a peer policy for the supplicant device, updating the trust topology map based upon the response and including the peer policy.

In an embodiment, the method further comprises causing displaying the updated trust topology map as a logical map depicting one or more network devices present in the secure data network, and roles assigned to the one or more devices.

2.0 Structural and Functional Overview

In an embodiment, a system or process creates trust topology maps built from trust relationships or security relationships established among devices. The trust topology maps can be developed from information included in authentication conversations or transmitted in Authentication, Authorization and Accounting (AAA) messages.

In an embodiment, a trust topology map is created and updated using the information acquired by an AAA server during an authentication and authorization process executed between network devices and the AAA server and using the information that is available to the AAA server from other sources. Using that information, a network management system can develop and maintain a trust topology map as a representation of a virtual layer of the network topology. In an implementation that relies on the TrustSec protocol, the network management system can develop a TrustSec network topology.

In an embodiment, a trust topology map is passively learned from communications exchanged while a supplicant attempts to gain access to a secure network. For example, the trust topology map can be passively learned from the TrustSec communications, or from communications specific to other protocols. Furthermore, the trust topology map can be quickly updated as new links and devices are added to the secure network. Building a trust topology map for the secure network can be accomplished by collecting information that is exchanged for example, using the TrustSec messages and does not require generating any additional data traffic or adding any additional functionality, such as SNMP, telnet, or other query mechanisms, otherwise required to build other kinds of topology maps using other approaches.

While a map for a physical layer network topology depicts physical devices and physical connections between the devices and a map for a logical layer network topology depicts logical connections between the devices, a trust topology map depicts the trust relationships and secure relationships existing between network devices in the network.

In an embodiment, a trust topology map is built from information included in messages exchanged in compliance with the Remote Authentication Dial In User Service (RADIUS) protocol. RADIUS is a networking protocol that provides centralized AAA management for devices to request access to the network resources.

FIG. 1 illustrates an embodiment of a data communications network 100 comprising network devices 110a, 110b, a management module 130, an AAA server 160, and a sub-network 150. Management module 130 can be a part of the AAA server 160, as depicted in FIG. 1. Alternatively, management module 130 can be implemented on a separate device that is communicatively coupled with AAA server 160. Management module 130 can be configured to determine trust topology maps from information about trust and secure relationships between network elements.

In an embodiment, network devices 110a, 110b can be any type of a workstation, laptop, PDA device, phone, switch, router, firewall of other device. AAA server 160 can be any type of server configured to perform AAA functions and to process messages specific to AAA requests, including TrustSec requests. Furthermore, AAA server 160 can be configured to process TrustSec access requests, TrustSec authentication requests and TrustSec policy requests. Moreover, network devices 110a, 110b and AAA server 160 can communicate with each other wirelessly or using any other media of communications.

For purposes of illustrating clear examples, FIG. 1 shows two (2) network devices 110a, 110b one AAA server 160 and one sub-network 150. However, practical embodiments may use any number of network devices, AAA servers and sub-networks.

In an embodiment, a sub-network 150 is communicatively coupled to network devices 110a, 110b and AAA server 160. Sub-network 150 is used to maintain various communications sessions and may implement one or more communications protocols.

Network devices 110a, 110b and AAA server 160 may implement the processes described herein using hardware logic such as in an application-specific integrated circuit (ASIC), field-programmable gate array (FPGA), system-on-a-chip (SoC) or other combinations of hardware, firmware and/or software.

In an embodiment, each of network devices 110a, 110b is configured to generate and transmit to other device various requests, including an access requests, authentication requests, authorization requests, policy requests and other types of requests. Furthermore, each of network devices 110a, 110b can be configured to process various requests, confirmations, and policy data.

In an embodiment, network devices 110a, 110b, AAA server 160 and sub-network 150 comprise hardware or software logic configured to generate and maintain various types of communications session information, and routing information for data communications network 100.

In an embodiment, network devices 110a, 110b and AAA server 160 implement TrustSec software. As an example, network devices 110a, 110b are Cisco Catalyst 6500 switches hosting TrustSec software.

Cisco TrustSec creates a trusted enterprise network encompassing switches, routers and other devices with a wireless network of controllers. It provides a foundation for authenticating supplicant devices, assigning roles to the supplicant devices, enforcing access policies and delivering integrity and confidentiality to the network traffic.

TrustSec takes the classic notion of access control lists tied to the information about the source and destination, and replaces it with the notion of the requestor role. The notion of a role is combined with processing access and authorization requests and may be represented in the map of the trusted and secure network.

One of the functionalities of Cisco TrustSec is to negotiate a secure link between hosts that support the communications protocol 802.1x. In an embodiment, TrustSec implements the schemes similar to wireless encryption schemes, in which a secure handshake is established along a layer two (L2) path.

In TrustSec, establishing a secure link starts from 802.1x negotiations. The 802.1x negotiations start with transmitting a certificate or other credentials from a supplicant device (neighbor) 110b to a network device 110a that already gained access to a secure network. The negotiations also include processing the certificate information by an AAA server 160, and communicating to the supplicant device 110b whether the received certificate information is legitimate.

Once the certificate processing is completed, an element of the network infrastructure, such as network device 110b, can be recognized by other devices in network 100.

Once the network infrastructure is aware of the supplicant device 110b, a switch can deploy an additional level of granular security control. The additional level comprises various security policies and roles associated with the supplicant device 110b. For example, the policy can provide for the type of encryption to be used by the supplicant device 110b.

In an embodiment, management module 130 comprises an access unit 112, an authentication unit 114, a policy unit 116, a trust topology map unit 118, a processor 120, and storage comprising a trust topology map 122.

For purposes of illustrating clear examples, FIG. 1 shows that management module 130 comprises one access unit 112, one authentication unit 114, one policy unit 116, one trust topology map unit 118, one processor 120, and one storage unit comprising one trust topology map 122. However, in practical embodiments, management module 130 may comprise one or more access units 112, one or more authentication units 114, one or more policy units 116, one or more topology map units 118, one or more a processors 120, and one or more storage units comprising one or more trust topology maps 122. Management module 130 can be a part of AAA server 130, as depicted in FIG. 1. Alternatively, management module 130 can be implemented on a separate device that is communicatively coupled with the AAA server 160.

In an embodiment, AAA server 160 can also comprise an access unit 112, an authentication unit 114, a policy unit 116, a trust topology map unit 118, a processor 120, and storage comprising a trust topology map 122.

In an embodiment, a processor 120 facilitates communications to and from management module 130, processes commands received by and executed by management module 130, processes responses received by management module 130, and facilitates various types of operations executed by management module 130. Processor 120 comprises hardware and software logic configured to execute various processes on management module 130.

In an embodiment, an access unit 112 is configured to receive and transmit access requests to other network devices in network 100. For example, access unit 112 of network device 110a can be configured to receive an access request from network device 110a, requesting access for network device 110b (supplicant), to AAA server 160.

Furthermore access unit 112 of management module 130 can be configured to receive access requests from other network devices in network 100. For example, access unit 112 of can be configured to receive an access request received from network device 110b.

In an embodiment, an authentication unit 114 is configured to generate and transmit authentication requests, and to receive responses to the authentication requests. Authentication unit 114 can communicate with other network devices and an AAA server 160. Furthermore, authentication unit 114 can receive authentication requests and transmit the authentication requests to other devices, such as an AAA server 160.

In an embodiment, a policy unit 116 is configured to receive policy requests, and transmit the requests to an AAA server 160. Moreover, policy unit 116 can be configured to receive the policies from AAA server 160 and from other devices, and to send the policy information to other network devices. Examples of the policies can include role based access control lists, encryption requirements, encryption keys, and other encryption options.

In an embodiment, a trust topology map unit 118 is configured to generate, maintain and update one or more trust topology maps from information pertaining to trust relationships or secure relationships established among network devices. For example, trust topology map unit 118 can be configured to use information included in messages transmitted to and from an AAA server as a part of authentication conversations. The messages transmitted between devices as a part of authentication, authorization and accounting (AAA) protocol messages can be used to establish any type of trusted relationships.

For example, trust topology map unit 118 can be configured to use access requests sent from network device 110a when network device 110a requests that a network device 110b (a supplicant) gains access to network 100

Furthermore, upon receiving a response to the access requests, trust topology map unit 118 can use the information included in the response to the access request to update a trust topology map for the network 110. For example, the information included in the response to the access request received by management module 130 can be used to update the trust topology map to indicate that network device 110b (a supplicant) became a part of the trusted network 100.

In an embodiment, a trust topology map 122 represents trust relationships or security relationships that have been established among devices in a secure network 100. Information stored in trust topology map 122 can be obtained by management module 130 by obtaining data that are communicated from network device 110a to AAA server 160. For example, trust topology map 122 can be created from information pertaining to access requests, responses to access requests, authentication/authorization requests, responses to authentication/authorization requests, policy requests, responses to policy requests, security protocol interactions such as IPSec negotiations, and other communications related to trust relationships or security relationships.

In an embodiment, an AAA server 160 executes a server computer program configured to receive and process requests for access to computer resources. AAA server 160 is configured to provide AAA services. AAA server 160 can be also configured to interact with network access and gateway servers and with databases and directories containing information about the users, policies and the user roles.

In an embodiment, AAA server 160 is configured to communicate with other devices using a variety of authentication protocols, such as RADIUS, TACACS+, or others.

In an embodiment, network device 110a comprises an access unit 172, an authentication unit 174, a policy unit 176 and a processor 178. The access unit 172 receives access requests from other devices, such as network device 110b (a supplicant), transmits the access requests to a management module 130 of an AAA server 160, and receives responses to the access requests. The authentication unit 174 receives authentication requests from other devices, such as network device 110b, transmits the authentication requests to management module 130 of AAA server 160, and receives responses to the authentication requests. The policy unit 176 receives policy requests from other devices, transmits the policy requests to management module 130, and receives polices from management module 130. The processors 178 facilitates communications to and from network device 110a, processes commands received by and executed by network device 110a, processes responses received by network device 110a, and facilitates various types of operations executed by network device 110a.

3.0 Determining Trust Topology Maps from Trust and Secure Relationships

Figure 2:
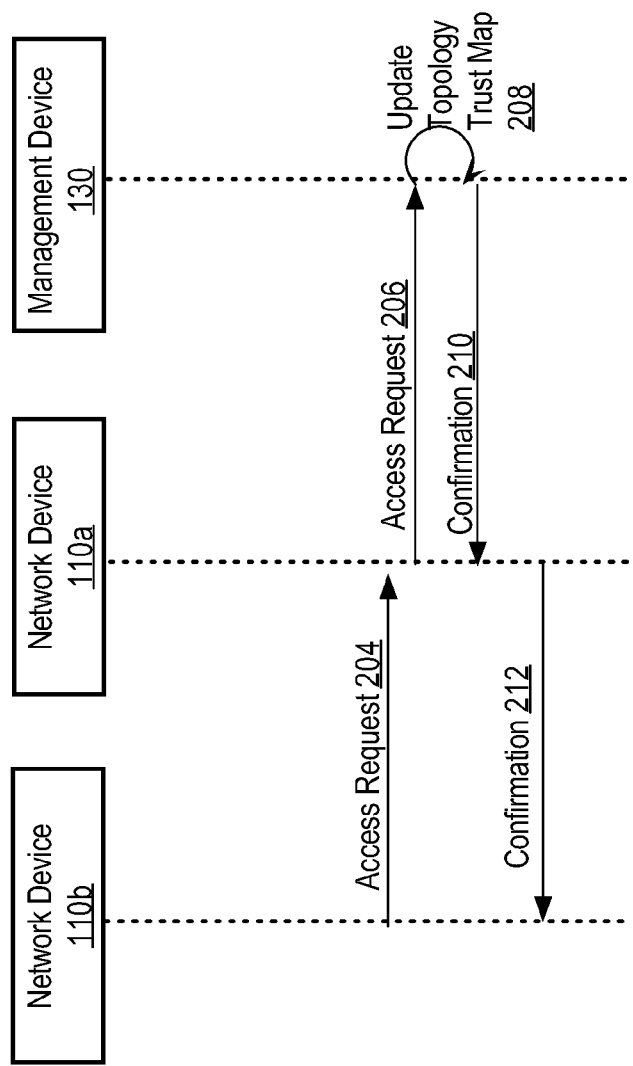
FIG. 2 illustrates an embodiment of determining trust topology maps from trust and secure relationships.

FIG. 2 illustrates an embodiment of determining trust topology maps from trust and security relationships. In an embodiment, a trust topology map is created from attribute information that is collected at runtime, and not preconfigured in a management module or an AAA server.

In an embodiment, network device 110b (a supplicant) is booting up. Network device 110b is referred to as a supplicant that has not yet been granted access to a secure network 100. As network device 110b is booted, network device 110b generates an access request 204 and sends the access request 204 to its neighbor, a network device 110a.

In an embodiment, at block 206, network device 110a (an authenticator) receives an access request, repackages the request, and transmits the repackaged access request to management device 130 (which can be implemented on an AAA server 160) for the AAA server to determine whether network device 110b can gain access to a secure network 100.

In an embodiment, at block 208, management device 130 (implemented for example on a AAA server 160) processes an access request and determines whether network device 110b can have access to secure network 100. If the access is granted, then, management device 130 updates a topology trust map to include in the topology trust map information indicating that network device 110b (supplicant) was granted access to secure network 100 and that network device 11b is a neighbor of network device 110a.

At block 210, management device 130 (of AAA server 160) generates an access confirmation, and transmits the access confirmation to network device 110a to confirm that network device 110b can access secure network 100. The confirmation is communicated at block 212 from network device 110a to network device 110b (supplicant).

However, in some circumstances, network device 110b cannot be granted access to secure network 100. If the network device 110b cannot be granted access to secure network 100, then management device 130 (of AAA server 160) generates and transmits a response to network device 110a to indicate that network device 110b cannot access secure network 100.

4.0 Processing Access Requests

Figure 3:
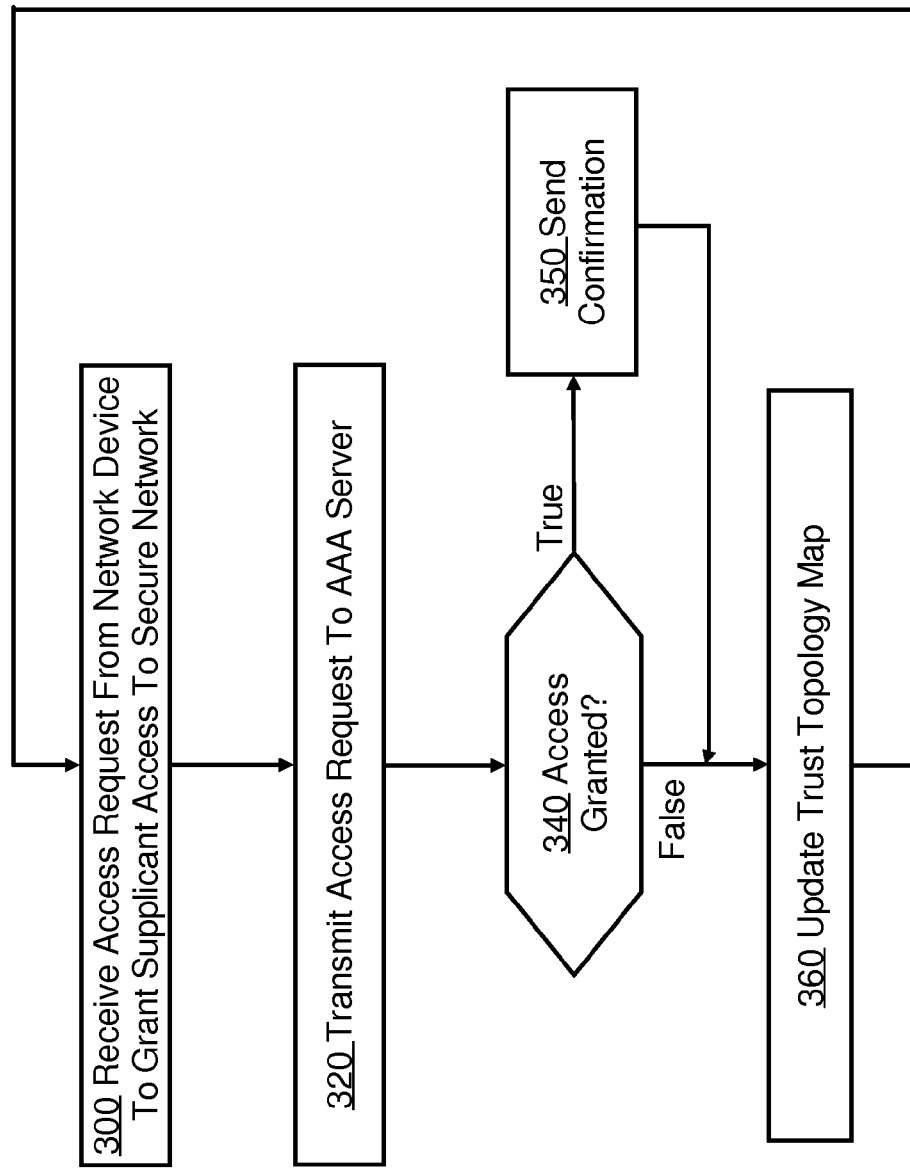
FIG. 3 illustrates an embodiment of determining trust topology maps from trust and secure relationships.

FIG. 3 illustrates an embodiment of determining trust topology maps from trust and secure relationships. In an embodiment, the steps depicted in blocks of FIG. 3 are performed by a management module 130 that is either implemented on an AAA server 160 (as depicted in FIG. 1), or implemented on a device that is communicatively coupled with the AAA server 160. In the description below, the steps are described as performed by a management module 130 implemented in an AAA server 160.

At block 300, a management module receives an access request from a network device 110a (an authenticator) to allow a network device 110b (a supplicant) to access a secure network 100. In 802.1x/EAP, a supplicant can be a name of the software application executed on a network device that requests authentication with an AAA server.

In an embodiment, an access request comprises a various types of information. For example, an access request can comprise information identifying a supplicant and a supplicant computer.

At block 320, a management module transmits access request to an authentication server. The access request can contain all or some of the information that the management module received at block 300. The access request of step depicted in block 320 can be transmitted either directly to the authentication server or via other network devices that serve as conduits between the requestor and the authentication server.

Once the request reaches an authentication server, the authentication server determines whether access to a secure network can be granted to the supplicant.

If an authentication server determines that a supplicant can be granted access to the secure network, then the authentication server generates an access confirmation message indicating that the supplicants is granted access to the secure network, and transmits the access confirmation to the management module.

However, if the authentication server determines that a supplicant cannot be granted access to the secure network, then the authentication server generates a message indicating that the supplicant's request to access the secure network has been denied, and transmits such a message to the management module.

At block 340, a management module receives a message from an authentication server indicating whether the access request from a supplicant has been granted or denied. The message might have been sent to the management module directly from the authentication server, or communicated from the authentication server via one or more trusted network devices in a trusted chain of devices.

Upon receiving a message from an authentication server, a management module determines whether the message indicates that the access request from a supplicant was granted. If the access request to access the requested resources was granted, then, at block 350, the management module sends an access confirmation to network device 110a and proceeds to step depicted in block 360. If the access request to access the requested resources was not granted, then, optionally, the management module can send an access denial message to network device 110a.

At block 360, a management module updates one or more trust topology maps maintained by the management module. In an embodiment, the management module updates its trust topology maps based on information indicating which device identifies itself as an authenticator and which device identifies itself as a supplicant. The trust topology maps are created and maintained using the information that is exchanged in requests such as access requests and exchanged in responses to the access requests. For example, the trust topology maps can be created and updated using the information that is exchanged between network devices supporting TrustSec and establishing secured and trusted connections. As the TrustSec messages are exchanged between network devices and an authentication server, the management module uses the content of the messages to update its trust topology map.

In an embodiment, creating, updating and maintaining the trust topology maps does not require collecting additional information other than the information exchanged in the TrustSec messages. For example, a management module can be configured to use the content of the TrustSec messages to determine the identity of an authenticator, and to determine the identity of an supplicant.

Figure 4:
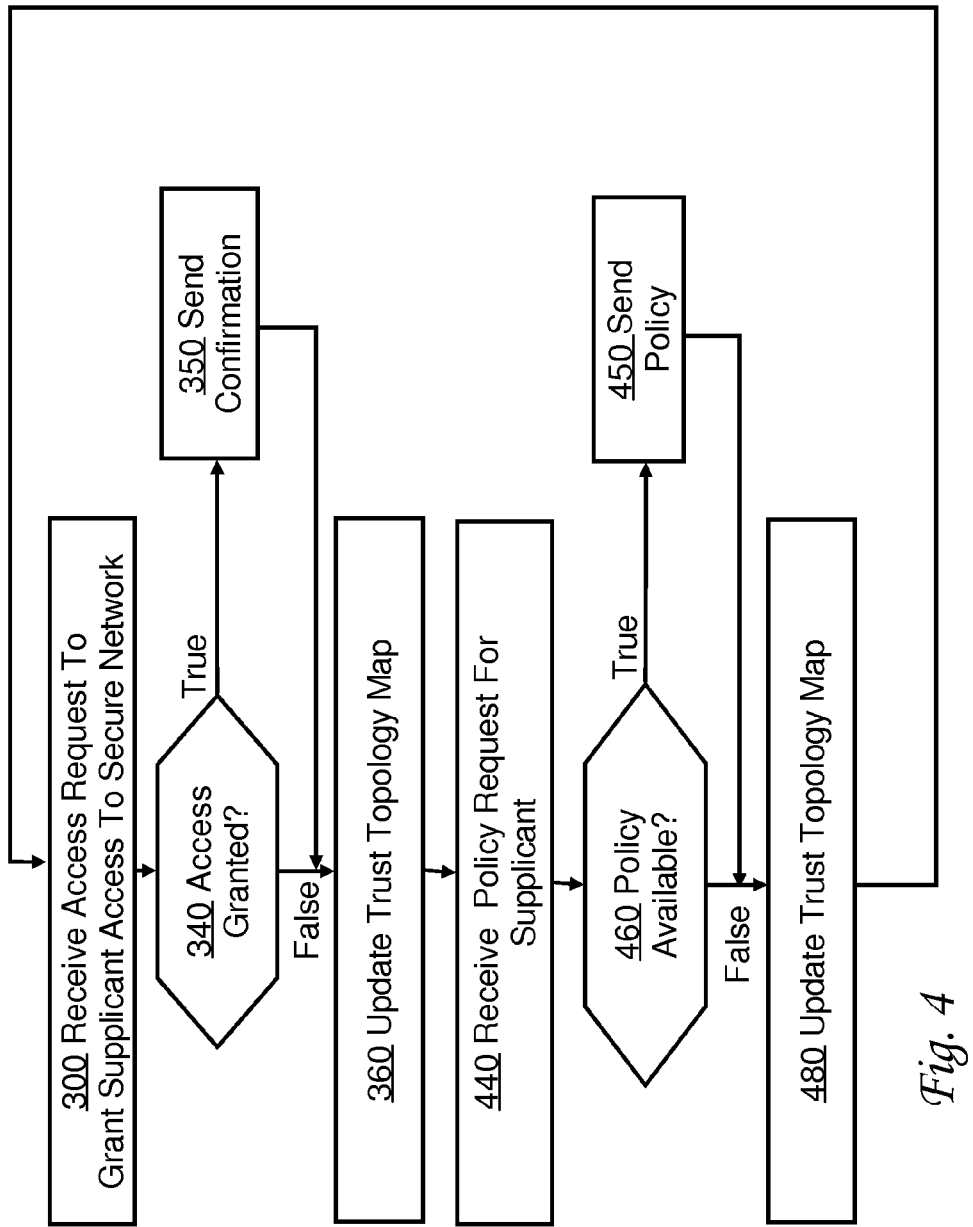
FIG. 4 illustrates an embodiment of determining trust topology maps from trust and secure relationships.

FIG. 4 illustrates an embodiment of determining trust topology maps from trust and security relationships. In an embodiment, the steps depicted in blocks of FIG. 4 are performed by a management module 130 implemented in an AAA server 160.

In FIG. 4, the steps depicted in blocks 300, 340, 350 and 360 correspond to steps depicted in blocks 300, 340, 350 and 360, respectively, described in FIG. 3 above.

Upon completing step in block 360, a management module proceeds to block 440.

At block 440, a management module receives a policy request from a network device 110a (an authenticator) to obtain a peer policy for a network device 110b (a supplicant), and transmits the policy request to an AAA server. In an embodiment, a policy request comprises a various types of information. For example, the policy request can comprise request for information about one or more roles that have been assigned to the supplicant, an encryption scheme, encryption keys, or other information pertaining to encryption and securing communications between the supplicant and other devices in the network.

Upon receiving a policy request from management module, an AAA server processes the policy request, determines one or more roles that have been assigned to the supplicant, and determines one or more sets of policies for the supplicant. If the roles and the policies have been defined for the supplicant and are available to the AAA server, then the AAA server retrieves the policies and transmits the policies to the management module.

However, if an AAA server cannot determine any role assignment for the supplicant, and/or any policy assignment for the supplicants, then the AAA server generates a message indicating that no policy is available for the supplicant, and sends such a message to the requestor.

At block 460, a management module receives a policy message from an AAA server, and determines whether the message comprises any valid policy assigned for a supplicant. If the message comprises a valid policy, such as one or more roles assigned to the supplicant, valid encryption keys or valid encryption schemes, then the management module proceeds to step in block 450, in which the management module sends the policy to the network device 110a (authenticator), and proceeds to step in block 480. However, if the message indicates that no valid policy has been associated, then the management module, optionally, sends an error message to the network device 110a to indicate that no valid policy is associated with the supplicant, and proceeds to step in block 480.

At block 480, a management module updates its trust topology map. For example, upon receiving a peer policy for a supplicant, the management module can include in its trust topology map the information indicating the policy information for the supplicant, and that one or more roles are assigned to the supplicant, which is now a part of a secure network.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
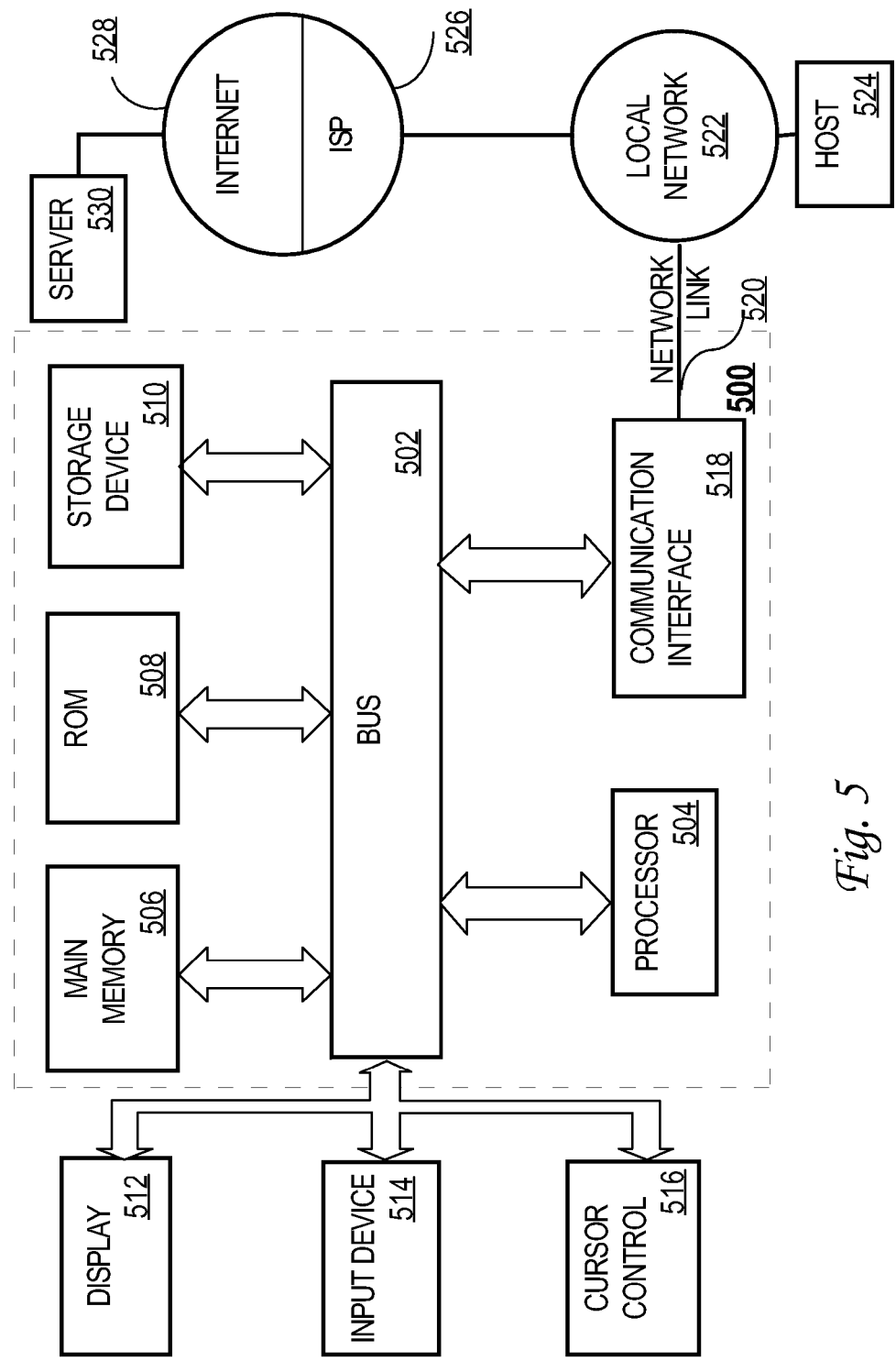
FIG. 5 illustrates an example computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term storage media as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the Internet 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method for enhancing capabilities of a communications device to enable generating trust relationships based on dynamically created maps of network trust relationships established among network devices, the method comprising:
   receiving, at a server computer, one or more authentication protocol messages from an authenticator computer device to authenticate a supplicant computer device;
   transmitting, from the server computer, the one or more authentication protocol messages to an authentication computer server;
   displaying on a digital computer display device a trust topology map as a graphical diagram and comprising information about trusted and untrusted links, encrypted and unencrypted links, authenticated and unauthenticated users, peer policies applied on the links, and roles associated with endpoints of the links;
   after sending one or more corresponding response messages comprising one or more responses to the one or more authentication protocol messages, updating, based on the one or more responses, the trust topology map with information reflecting peer security policy data that indicates a secure link between the authenticator computer device and the supplicant computer device, and changes in one or more security trust relationships between the authenticator computer device and the supplicant computer device based on the authentication protocol messages and the response messages, and in which links and paths are coded according to encryption capabilities, security properties and other characteristics identified in the response and the peer security policy data.

2. The method of claim 1, wherein the authentication protocol messages are TrustSec extensions to known authentication protocols.

3. The method of claim 1, comprising updating the trust topology map in response to recognizing a new device or a new link.

4. The method of claim 1, comprising:
after sending an indication that an access request was not granted, updating the trust topology map by including, in the trust topology map, information indicating that no link has been established between the authenticator computer device and the supplicant computer device.

5. The method of claim 1, comprising:
receiving a peer policy request, from the authenticator computer device or from the supplicant computer device, to obtain a peer policy for the supplicant computer device;
after determining that the peer policy for the supplicant computer device is not received, updating the trust topology map by including, in the trust topology map, information indicating that the peer policy for the supplicant computer device is unavailable.

6. The method of claim 4,
wherein the supplicant computer device and the authenticator computer device are neighbors;
wherein the access request comprises identification information of the authenticator and supplicant computer devices.

7. The method of claim 4,
wherein the access request comprises information about a manner in which the authenticator computer device and the supplicant computer device communicate with each other.

8. An internetworking computer device comprising:
one or more processors;
an access unit coupled to the one or more processors and configured as a management computer device and configured to perform:
receiving, at a server computer, one or more authentication protocol messages from an authenticator computer device to authenticate a supplicant computer device;
transmitting, from the server computer, the one or more authentication protocol messages to an authentication computer server;
displaying on a digital computer display device a trust topology map as a graphical diagram and comprising information about trusted and untrusted links, encrypted and unencrypted links, authenticated and unauthenticated users, policies applied on the links, and roles associated with endpoints of the links;
after sending one or more corresponding response messages comprising one or more responses to the one or more authentication protocol messages, updating, based on the one or more responses, the trust topology map with information reflecting peer security policy data that indicates a secure link between the authenticator computer device and the supplicant computer device, and changes in one or more security trust relationships between the authenticator computer device and the supplicant computer device based on the authentication protocol messages and the response messages, and in which links and paths are coded according to encryption capabilities, security properties and other characteristics identified in the response and the peer security policy data.

9. The internetworking computer device of claim 8, wherein the authentication protocol messages are TrustSec extensions to known authentication protocols.

10. The internetworking computer device of claim 8, wherein the access unit is configured to perform updating the trust topology map in response to recognizing a new device or a new link.

11. The internetworking computer device of claim 8, wherein the access unit is configured to perform:
after sending an indication that an access request was not granted, updating the trust topology map by including, in the trust topology map, information indicating that no link has been established between the authenticator computer device and the supplicant computer device.

12. The internetworking computer device of claim 8, wherein the access unit is configured to perform:
receiving a peer policy request, from the authenticator computer device or from the supplicant computer device, to obtain a peer policy for the supplicant computer device;
after determining that the peer policy for the supplicant computer device is not received, updating the trust topology map by including, in the trust topology map, information indicating that the peer policy for the supplicant computer device is unavailable.

13. The internetworking computer device of claim 11,
wherein the supplicant computer device and the authenticator computer device are neighbors;
wherein the access request comprises identification information of the authenticator and supplicant computer devices.

14. The internetworking computer device of claim 11,
wherein the access request comprises information about a manner in which the authenticator computer device and the supplicant computer device communicate with each other.

15. A non-transitory computer-readable storage medium storing one or more sequences of instructions which, when executed by one or more processors, cause the one or more processors of a management computer device to perform:
receiving, at a server computer, one or more authentication protocol messages from an authenticator computer device to authenticate a supplicant computer device;
transmitting, from the server computer, the one or more authentication protocol messages to an authentication computer server;
displaying on a digital computer display device a trust topology map as a graphical diagram and comprising information about trusted and untrusted links, encrypted and unencrypted links, authenticated and unauthenticated users, policies applied on the links, and roles associated with endpoints of the links;
after sending one or more corresponding response messages comprising one or more responses to the one or more authentication protocol messages, updating, based on the one or more responses, the trust topology map with information reflecting peer security policy data that indicates a secure link between the authenticator computer device and the supplicant computer device, and changes in one or more security trust relationships between the authenticator computer device and the supplicant computer device based on the authentication protocol messages and the response messages, and in which links and paths are coded according to encryption capabilities, security properties and other characteristics identified in the response and the peer security policy data.

16. The non-transitory computer-readable storage medium of claim 15, wherein the authentication protocol messages are TrustSec extensions to known authentication protocols.

17. The non-transitory computer-readable storage medium of claim 15, comprising additional instructions which, when executed, cause: updating the trust topology map in response to recognizing a new device or a new link.

18. The non-transitory computer-readable storage medium of claim 15, comprising additional instructions which, when executed, cause: after sending an indication that an access request was not granted, updating the trust topology map by including, in the trust topology map, information indicating that no link has been established between the authenticator computer device and the supplicant computer device.

19. The non-transitory computer-readable storage medium of claim 15, comprising additional instructions which, when executed, cause:

receiving a peer policy request, from the authenticator computer device or from the supplicant computer device, to obtain a peer policy for the supplicant computer device;

after determining that the peer policy for the supplicant computer device is not received, updating the trust topology map by including, in the trust topology map, information indicating that the peer policy for the supplicant computer device is unavailable.

20. The non-transitory computer-readable storage medium of claim 18, wherein the supplicant computer device and the authenticator computer device are neighbors;

wherein the access request comprises identification information of the authenticator and supplicant computer devices.

* * * * *